United States Patent [19]

Lievre

[11] Patent Number: 4,732,354
[45] Date of Patent: Mar. 22, 1988

[54] ACTIVE DAMPING OF SATELLITE NUTATION

[75] Inventor: Jérôme Lievre, Bagneux, France

[73] Assignee: MATRA, Paris, France

[21] Appl. No.: 850,018

[22] Filed: Apr. 10, 1986

[30] Foreign Application Priority Data

Apr. 19, 1985 [FR] France .................................. 85 06013

[51] Int. Cl.$^4$ .............................................. B64G 1/38
[52] U.S. Cl. ..................................... 244/170; 244/168
[58] Field of Search ................. 244/170, 173, 165, 164

[56] References Cited

U.S. PATENT DOCUMENTS

| | | | |
|---|---|---|---|
| 3,877,316 | 4/1975 | Reiter et al. | 244/170 |
| 4,071,211 | 1/1978 | Muhlfelder | 244/165 |
| 4,084,772 | 4/1978 | Muhlfelder | 244/165 |
| 4,096,427 | 6/1978 | Rosen et al. | 244/170 |
| 4,230,294 | 10/1980 | Pistener | 244/170 |
| 4,272,045 | 6/1981 | Phillips | 244/170 |
| 4,288,051 | 9/1981 | Göschel | 244/165 |
| 4,294,420 | 10/1981 | Broquet | 244/165 |
| 4,325,124 | 4/1982 | Renner | 244/173 |

FOREIGN PATENT DOCUMENTS 2530046  1/1984  France .................................. 244/173

OTHER PUBLICATIONS

"Attitude Acquisition Maneuver Bias Momentum Satellites", by Kaplan and Patterson, Comsat Technical Review (Spring 1976).

Primary Examiner—Sherman D. Basinger
Assistant Examiner—Lynn M. Fiorito
Attorney, Agent, or Firm—Larson and Taylor

[57] ABSTRACT

For controlling nutation of a three-axis stabilized satellite, the angular speed of a solar panel carried by the satellite is selectively and temporarily varied about an average value for modifying the inertia cross-product thereof and generating an angular momentum transverse to the angular momentum present in said body with a phase with respect to the nutation motion which tends to decrease the amplitude of the nutation motion.

7 Claims, 8 Drawing Figures

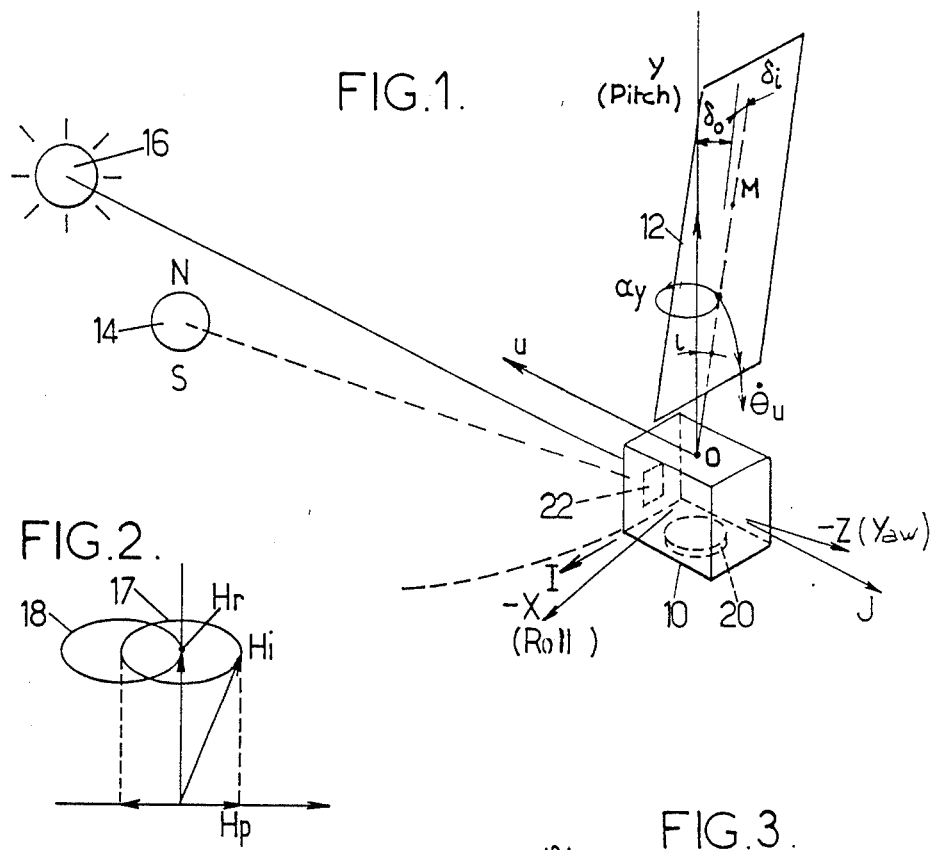
FIG.1.
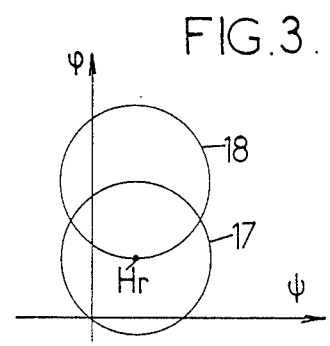
FIG.2.
FIG.3.
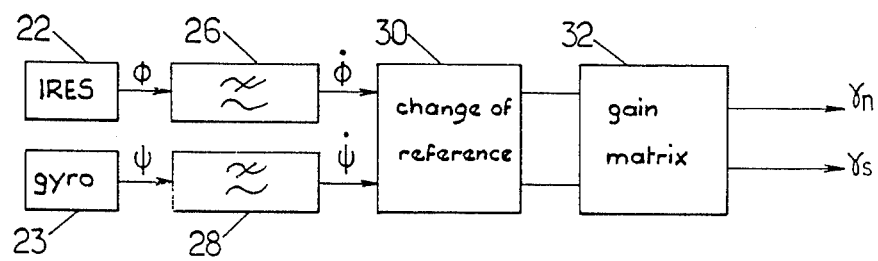
FIG.4.

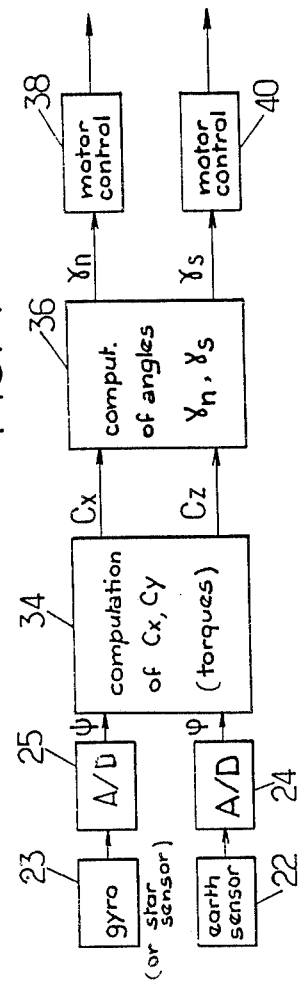
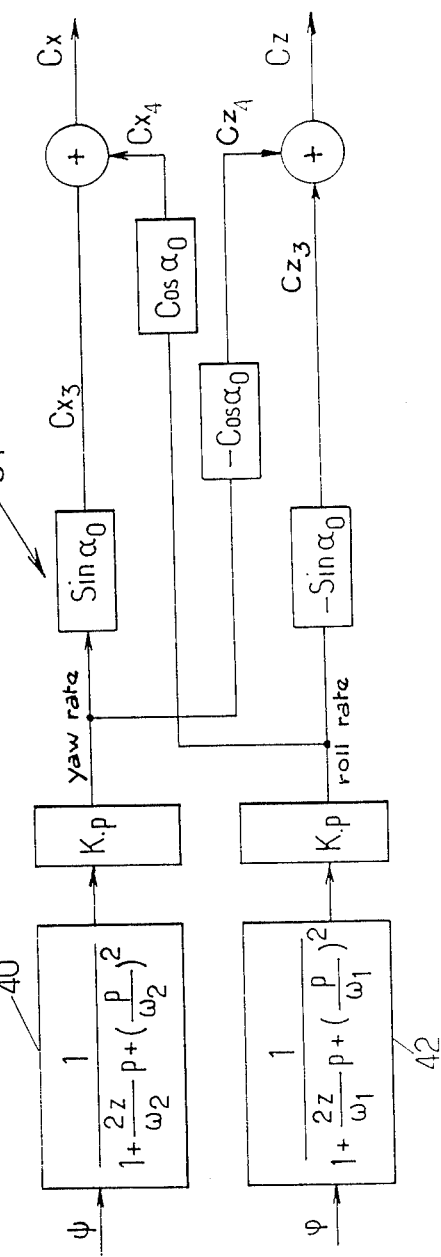

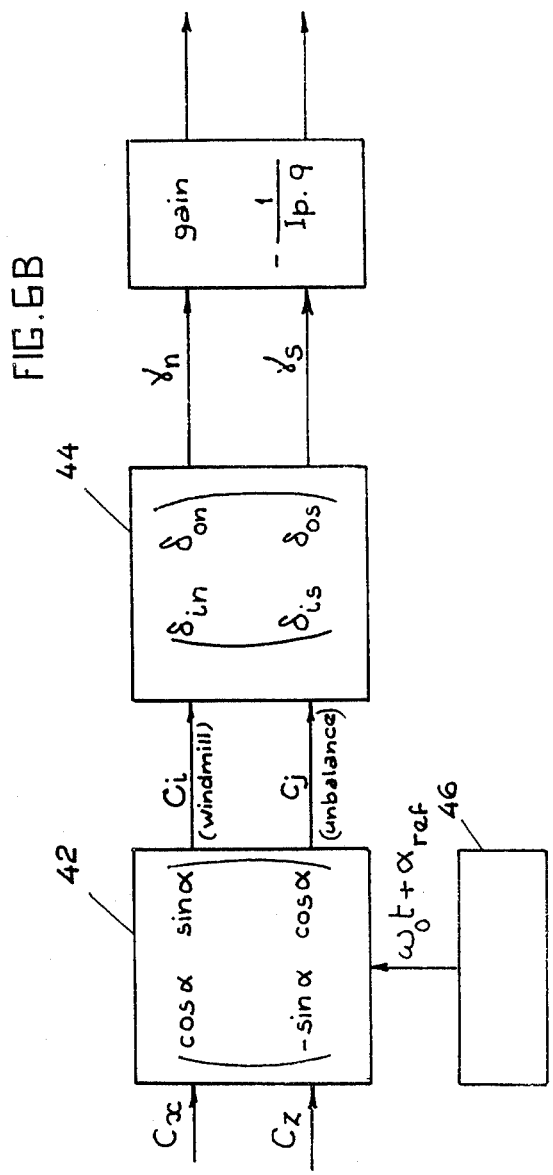

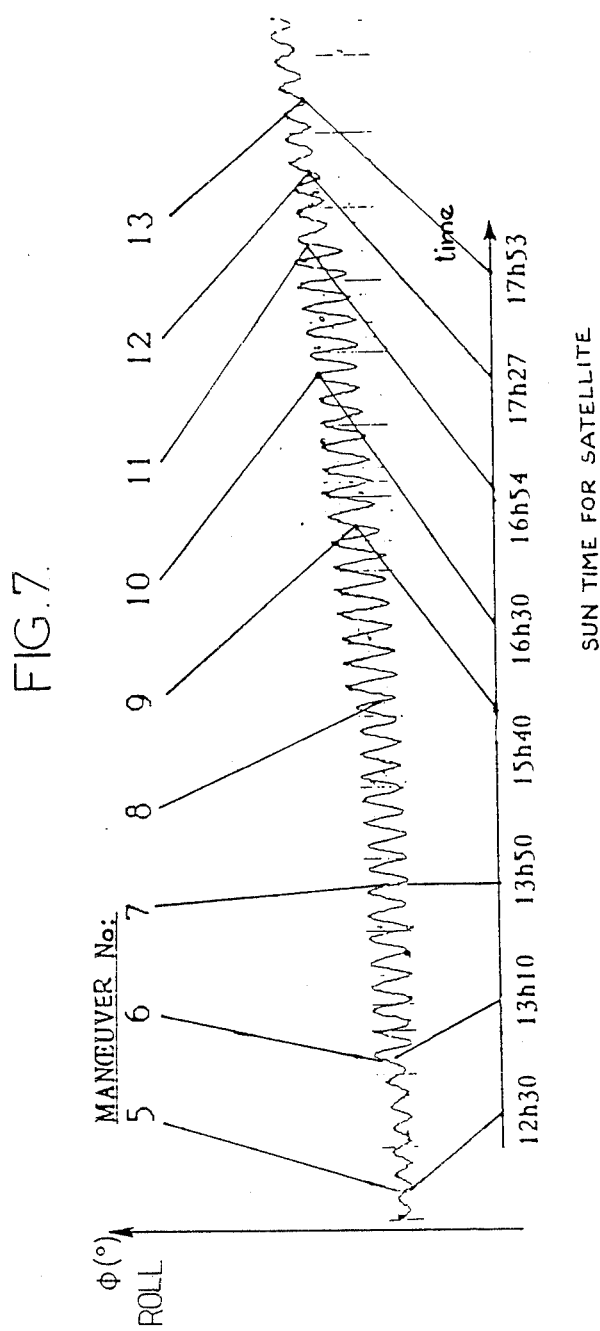

ACTIVE DAMPING OF SATELLITE NUTATION

BACKGROUND OF THE INVENTION

1. Field of the Invention

The invention relates to the processes and apparatuses for damping the nutation of three-axis stabilized satellites including at least one wheel providing an angular momentum (or kinetic momentum) and a mass providing an inertia product about the angular momentum which may be controlled. The invention is particularly suitable for use in geosynchronous satellites having orientable solar arrays and whose nutation speed remains low (typically in the $10^{-3°}$/sec. order of magnitude) when the satellite is at its final station on a geosynchronous orbit.

2. Prior Art

Upon examination of the curves representing the rolling movements of a geostationary satellite, as reconstructed from measurements, it appears that nutation movements occur and reach substantial values after certain manoeuvres. For instance, when the solar arrays of the satellite are rapidly pointed again toward the sun after an eclipse, nutation of the momentum about its set position (typically North-South) may occur.

Nutation damping by using yaw and roll attitude control thrusters has been used for long. But it requires a fuel consumption which reduces the useful life of the satellite.

It is also known to control the attitude of a satellite by temporarily depointing solar arrays which may be provided with flaps for increased "solar sailing" control efficiency, as described in European No. 101,333 of the assignee of the present invention. However, "solar sailing" using a solar array rotating about a North-South axis passing through the center of gravity of the array does not make it possible to create torques adapted to dampen all nutation movements.

SUMMARY OF THE INVENTION

I have found that it is possible to control nutation by moving at least one mass carried by the body of a three-axis stabilized satellite having a momentum biased control system if that mass has a non-zero inertia cross-product. The mass may consist of one (or more) of the solar arrays currently carried by geosynchronous satellites, however subject to the condition that it has (or they have) a misalignment, i.e. that the center of gravity be outside of the axis of rotation, located along the North-South direction. I have further determined that the amounts of angular depointing which are necessary for full control, when the satellite is at its station, remain acceptable even with misalignments which are very low and which are even difficult to avoid on actual satellites. Typically, the misalignment will be of some tenths of a degree up to 2°.

A method according to the invention for controlling nutation of a three-axis stabilized satellite comprises the steps of selectively and temporarily varying the position of a mass carried by the satellite about an average set position for modifying the inertia cross-product thereof and generating an angular momentum transverse to the angular momentum present in said body with a phase with respect to the nutation motion which tends to decrease the amplitude of the nutation motion.

On a satellite provided with solar arrays or solar panels having misalignments or "biases", the amplitude and phase of the nutation motion are measured and the rotational speed of the solar arrays are temporarily varied with respect to the average value required for maintaining them aimed at the sun.

The invention will be better understood from the following description of a particular embodiment thereof, given by way of example.

SHORT DESCRIPTION OF THE DRAWINGS

FIG. 1 is a simplified diagram showing the arrangement of a satellite and one of the solar panels which it carries with respect to the Earth and to the Sun;

FIGS. 2 and 3 are diagrams showing the angular momentums which appear in the correction process of the invention, when the solar panels are used for nutation damping;

FIG. 4 is a simplified block diagram of a device for implementing the invention;

FIG. 5 is a diagram of a device for implementing the invention forming a modification of that of FIG. 4, for damping the nutation by a roll-yaw action;

FIGS. 6 and 6B are block diagrams of an embodiment of networks for changing from an absolute triad to a satellite bound triad and for motor control in the diagram of FIG. 5;

FIG. 7 is a curve representing the effect of manoeuvres on nutation.

DETAILED DESCRIPTION OF A PREFERRED EMBODIMENT

Before the invention is described, it may be useful to provide some general considerations on nutation of a momentum bias controlled three-axis stabilized geosynchronous satellite and control thereof.

Referring to FIG. 1, a satellite has a body 10 stabilized by one or more momentum wheels 20 and provided with solar arrays or panels 12, one of which only, namely the North array, is shown. Motion may be measured about satellite axes, namely a roll axis X, a North-South pitch axis Y and a yaw axis Z which is maintained pointed toward the Earth 14.

Each solar panel 12 is provided with a motor (not shown) controlled for maintaining the panel aimed at the Sun 16 (along direction U in FIG. 1) by rotating the panel about axis Y at a speed of 360° per day. The motor is typically an electrical step motor controlled in open loop.

Due to mechanical construction tolerances, or willfully, panel 12 may have a misalignment. Then its center of gravity M (where the mass of the panel may be assumed concentrated) is not on the pitch axis Y. The line OM connecting the center of gravity to the foot of the axis of rotation on body 10 forms an angle i with Y. Angle i will always be small, typically lower than 2°.

Then any rotation of panel 12 at speed $\dot{\alpha}_y$ about axis Y upon energization of its drive motor will cause a rotation about direction U (situated in the roll-yaw plane) at speed $\dot{\theta}_u$:

$$\dot{\theta}_u = i \cdot \dot{\alpha}_y \qquad (1)$$

The angular inertia $I_u$ of the panel during rotation about axis U is much greater than the inertia $I_y$ during rotation about axis Y. $I_u$ will typically be greater than $I_y$ by about two orders of magnitude. For instance, for the TELECOM 1 satellite:

$$I_y = 7 m^2 \cdot kg$$

$I_u = 450 m^2 \cdot kg$

If a misalignment exists, each panel may be considered as a wheel rotating at a speed proportional to the rotational speed of the panel but much smaller.

The relations between the parameters defining the attitude of the satellite body 10 and the position of the panel(s) may then be written:

$$\begin{cases} I_s \dot{P} - R \cdot H_y - I_p \cdot i \cdot \dot{\alpha}(\dot{\alpha} + Q)\cos \alpha = 0 \\ I_s \dot{R} + P \cdot H_y + I_p \cdot i \cdot \dot{\alpha}(\dot{\alpha} + Q)\sin \alpha = 0 \end{cases} \quad (2)$$

where $I_s$ is the inertia of the complete satellite about an axis in the plane XZ (roll-yaw plane);

$I_p$ is the inertia of the panel(s) during rotation about the same axis;

$H_y$ is the algebraic value of the angular momentum about the pitch axis Y;

the term $I_p \cdot i \cdot \dot{\alpha}(\dot{\alpha}+Q)$ has two components when there are two solar panels, one for each panel; for each panel, i is the misalignment, $\dot{\alpha}$ is the speed of rotation about Y and $I_p$ is the angular inertia of the panels about the above-mentioned axis in the roll-yaw plane, $\alpha$ is the angular position of the panel which is changed as a linear function of the solar time and is also adjustable by manoeuvring, so that it may be written:

$$\alpha = /\omega_O/t + \dot{\alpha}_1 t + \alpha_{ref}$$

where $/\omega_O/$ is the angular frequency on orbit (one complete turn /24 h), $\dot{\alpha}_1$ the superimposed manoeuvring speed with respect to the satellite and $\alpha_{ref}$ the skew of the panel with respect to the Sun, P, Q and R are the speeds of rotation of the satellite about X, Y and Z, as determined using the approximation for the small angles, of the derivatives of Euler's angles.

At first sight, it seems that, in a geosynchronous satellite, Q (which is equal to 0.25°/min) can be neglected as compared to $\dot{\alpha}$ which reaches 5°/min and that consequently acting on the term $\dot{\alpha}Q$ in formula (2) is without practical interest:

But—and this is an element which was in no way obvious—the products $\dot{\alpha}^2$ and $\dot{\alpha}Q$ do not intervene at all in the same way in formula (2). In fact:

the product $I_p \cdot i \cdot \dot{\alpha}^2$ is equivalent to an external torque acting on body 10 of the satellite and panel 12 which have a single degree of freedom with respect to each other, and it tends to move the center of nutation as long as $\dot{\alpha}$ is not equal to zero;

the product $I_p \cdot i \cdot Q \cdot \dot{\alpha}$, on the other hand, is equivalent to Q·Ht (Ht being the transverse angular momentum exchanged between the body and the panel in the roll-yaw plane, so directly acquired as an amount of nutation).

By way of example, for $I_p = 450 m^2 \cdot kg$, i = 1° and $\dot{\alpha} = 4.8°/mn$, the products will have the values:

$$I_p \cdot i \cdot \dot{\alpha}^2 = 3.1 \times 10^{-5} N \cdot m$$

$$I_p \cdot i \cdot \dot{\alpha} \cdot Q = 1.6 \times 10^{-6} N \cdot m \quad (3)$$

which, for a manoeuvring time of the panels of 25 seconds, leads to respective nutational increases Δnut due to the two terms of (3):

Δnut: 0.0018°

Δnut: 0.021°

Another possible mathematical approach consists in considering the body and its two panels as an assembly of three free bodies with connecting tensors. It again leads to finding a $\dot{\alpha}^2$ term which seems preponderant, but has only a very small effect on the nutation, and a term of much lower value, bringing into play the acceleration $\ddot{\alpha}$ of the panels and corresponding to the above term $\dot{\alpha} \cdot Q$. The latter term, which was usually disregarded due to the very short time during which it exists, applies to the body a transverse angular momentum Ht (as defined above) through the single degree of freedom connection and modifies the nutation by:

$$Ht = I_p \cdot i \cdot \dot{\alpha}$$

This result may as well be expressed as stating that modification of the nutation is not caused by the inertia cross products, but by their rapid variation in time.

From this observation, the conditions may be determined in which the nutation may be disturbed by temporarily modifying the speed of rotation $\dot{\alpha}$ of the solar panels, with an appropriate phase.

If the satellite is stabilized about three axes by at least one internal momentum wheel 20 having a resultant angular momentum Hr, nutational motion takes place as shown schematically in FIGS. 2 and 3. The internal angular momentum $Hi = Hr + Hp$ (Hp being the angular momentum of the panels), has a nutation motion about the total angular momentum equal to the momentum Hr of the wheel(s), such motion being represented by the circle 17. As seen by an infrared earth sensor (IRES) 22, the nutational motion is represented by circle 18. FIG. 3 shows the corresponding yaw angle $\psi$ and the roll angle $\phi$.

Considering the first order of magnitude only, the increase Δnut of nutation caused by panel rotation at speed $\dot{\alpha}$ for a time δt will be:

$$\Delta nut = \frac{2 (\sin \delta/2) \cdot I_p \cdot i \cdot \dot{\alpha}}{Hr}$$

with $\delta = \delta t / 2\pi T$.

If δt is small as compared with the period of nutation T, approximately:

$$\Delta nut = (I_p/I_t)\alpha \cdot i.$$

It being the momentum of inertia.

In the typical case of two solar panels having the same relative biases and with:

$It = 1500 m^2 \cdot kg$ $Ip = 450 m^2 \cdot kg$, i = 0.5°

$\alpha = 10°$.

then:

Δnut: 0.05°.

In a general way, any nutation which causes roll may be attenuated by modifying the speed $\dot{\alpha}$ of the solar panels, i.e. by slowing down the speed below $\omega_O$ (even by stopping the panels) then by returning to the set position corresponding to speed $\omega_O$ by high speed rotation, each time with an appropriate phase with respect to the nutation motion. The two panels may be controlled sequentially or simultaneously.

In certain cases, it may be difficult to measure the amount of biases of the solar arrays directly. Then it will be possible, as a first step after the satellite is at its station, to determine the plane in which is situated the line connecting the foot of the axis of rotation Y to the center of gravity M, then the value of the misalignment angle i, by measuring the nutation induced by selected manoeuvres.

The method of the invention may be carried out using a device whose detection means are well known, for example as described in French No. 2,259,389. The device described in that prior art document is however for controlling nutation by actuating thrusters. On the other hand, the invention makes use of solar panels having, when rotated, an angular momentum which is not aligned with the total angular momentum $H_R$ subjected to nutation.

A control algorithm may then be:

$$\begin{pmatrix} \gamma_n \\ \gamma_s \end{pmatrix} = \begin{pmatrix} K_1 & K_2 \\ K_3 & K_4 \end{pmatrix} \begin{pmatrix} \cos\alpha & -\sin\alpha \\ \sin\alpha & \cos\alpha \end{pmatrix} \begin{pmatrix} \phi - \phi_0 \\ \psi - \psi_0 \end{pmatrix}$$

In that formula:
$\phi$ and $\psi$ are the roll and yaw attitude angles, as shown in FIGS. 2 and 3,
$\phi_O$ and $\psi_O$ are constant predetermined values,
$\gamma_n$ and $\gamma_s$ are the angles of the North panel and of the South panel measured in satellite axes, with respect to the set position aimed at the Sun,
$K_1$, $K_2$, $K_3$ and $K_4$ are gain values, which are determined by calculation for optimum performance.

The control apparatus may then be constructed as indicated as a simplified block diagram in FIG. 4. The signals representing $\phi$ and $\psi$ are derived from signals supplied by an IR earth sensor 22 and by a gyrometer 23. The signals are digitized and applied to filters 26 and 28 for removing the high frequency noise components. In practice, filters may be used having a cut-off frequency of about twice the expected nutation frequency. Two different filters may be used if the detectors (IRES 22 and gyro 23) have different pass bands. The output signals from the filters are applied, as input signals, to a circuit 30 for changing the data from a reference triad related to the satellite to an inertial axes triad. Such a transformation is frequently necessary on satellites and may be carried out by well known wired or programmed computers. The output signals, in the new (inertial) reference system, are applied to a gain matrix 32 which generates the signals applied to the motors aiming the North and South solar panels carried by the satellite.

Very often, the control algorithms may be simplified because some terms are of the second order as compared to the others. The torques exerted on body 10 due to rotation of the panels may then be written as:

$$\begin{pmatrix} C_I \\ C_J \end{pmatrix} = -I_p \begin{pmatrix} \delta_{in} & \delta_{is} \\ \delta_{on} & \delta_{os} \end{pmatrix} \begin{pmatrix} \dot{\gamma}_n \cdot q \\ \dot{\gamma}_s \cdot q \end{pmatrix} \quad (4)$$

In this formula (4):
$q = (\dot{\theta} - \omega_O) \cos\phi \cdot \cos\psi - \dot{\phi} \sin\psi$, where $\phi$, $\theta$, $\psi$ are Euler's angles and $\omega_O$ is the angular frequency on orbit;
Ip is the inertia of a panel about an axis in the roll-yaw plane;
$\gamma_n$ and $\gamma_s$ are the angles of rotation of the North and South panels, respectively;
$\delta_{in}$, $\delta_{is}$, $\delta_{on}$ and $\delta_{os}$ are the biases of the North and South panels in the plane orthogonal to J (if with the index i) and out of that plane (index o);
$C_I$ and $C_J$ are the torques, along inertial axes I and J (the third inertial axis being Y).

If conversion is made from the inertial axes I, J, Y to the satellite axes X, Z, Y, the torques applied about the axes X and Z are written:

$$\begin{pmatrix} C_x \\ C_z \end{pmatrix} = \begin{pmatrix} \cos\alpha & -\sin\alpha \\ \sin\alpha & \cos\alpha \end{pmatrix} \begin{pmatrix} C_I \\ C_J \end{pmatrix} \quad (5)$$

On the other hand, the control torques are related to the roll and yaw speeds $\phi$ and $\psi$:

$$\begin{pmatrix} C_x \\ C_z \end{pmatrix} = -K \begin{pmatrix} \cos\alpha_0 & -\sin\alpha_0 \\ \sin\alpha_0 & \cos\alpha_0 \end{pmatrix} \begin{pmatrix} \phi \\ \psi \end{pmatrix} \quad (6)$$

where:
$\alpha_O$ is a time delay, representing a phase lag, which may be estimated from the time constant of the filters and the time of response of the motors.

Consequently, the gain matrix may be readily determined from the above formulae and from a determination of the constant coefficients either by calculation, or based on the results of measurements carried out on the satellite while the latter is at its station.

FIG. 5 is a diagram of a device implementing algorithms (4), (5) and (6). At predetermined intervals (typically about 0.1 sec), the signals delivered by IRES 22 and gyro 23 are sampled and digitized by 24 and 25, then applied to a signal processing channel comprising circuits 34 and 36. Circuit 34 may be as shown in FIG. 6A and need not be described in detail, since all components may be conventional in nature.

Referring to FIG. 6A, the signals representing $\psi$ and $\phi$ are applied to filters 40 and 42 for removing noise. The two filters may be identical. They may however be different if the gyro 23 and IRES 22 have different pass bands. The algorithm of the filters may be as indicated in FIG. 6A with:

$$\omega_1 = \omega_2 = 2\omega \text{ nutation}$$

The yaw and roll representative signals delivered by circuits 40 and 42 are applied to derivative networks which deliver signals representative of the yaw and roll rates. The gain k is selected depending upon the inertia.

The value of k is also selected for avoiding excess manoeuvring speeds $\dot{\alpha}$. The rate representing signals are applied to a matrix of multipliers and summation circuits introducing a phase advance $\alpha_O$ of some degrees (frequently about 10°) for compensating the time constants. Referring again to FIG. 6A, $C_{x3}$ and $C_{x4}$ designate the two terms which are summed for providing $C_x$ while $C_{z3}$ and $C_{z4}$ are the two corresponding terms of $C_z$.

Circuit 36 may consist of a wired computing circuit or its function may be fulfilled by a general purpose computer included in the satellite and having other functions. In any case, it will be wired or programmed to operate according to the equation:

$$\begin{pmatrix} \dot{\alpha}_n \\ \dot{\alpha}_s \end{pmatrix} = \frac{-1}{I_p \cdot q} \begin{pmatrix} \delta_{in} & \delta_{is} \\ \delta_{on} & \delta_{os} \end{pmatrix}^{-1} \begin{pmatrix} \cos\alpha & \sin\alpha \\ -\sin\alpha & \cos\alpha \end{pmatrix} \begin{pmatrix} C_x \\ C_z \end{pmatrix}$$

In that formula:
$\alpha$ designates the angle of a solar array about its axis of rotation, in a satellite reference system,
$C_x$ and $C_z$ are the torque values as represented by the signals from circuit 34.

Since the above equation requires that a matrix be inversed, it may be preferable to use a similar relation, but with the matrix using $\delta$ terms substituted with:

$$\begin{pmatrix} \delta_{in} & \delta_{on} \\ \delta_{is} & \delta_{os} \end{pmatrix}$$

Circuit 36 may have the arrangement illustrated in block diagram form in FIG. 6B including:
- a circuit 42 for applying the matrix of trigonometric functions of $\alpha$ and delivering $C_i$ and $C_j$ (windmill torque and unbalance torque),
- a circuit 44, which constitutes a mathematical model of the biases of the solar arrays. The output signals from 44 are subjected to multiplication by a predetermined gain, selected in function of the Euler angle $\alpha$.

The value of $\alpha$ is continuously provided to circuit 42 by a circuit 46 including a clock and storing $\omega_O$. The values of $\delta_{in}$, ... may be stored in circuit 44 or written in a store of 44 after they have been determined by a ground station.

The control circuits 38 and 40 have a structure which depends on the type of the array actuating motors.

By way of example, data will now be given corresponding to the TELECOM 1A satellite for which the misalignment or biases are:

$\delta_n = 0.2°$ out of plane, sun side; $\delta_{in} = 0°$ and $\delta_{on} = +0.2°$.

$\delta_s = 0.75°$ in the plane orthogonal to J; $\delta_{is} = +0.75°$ and $\delta_{os} = 0°$.

The inertia of each panel is:
7m²·kg with respect to axis Y passing through the center of gravity of the satellite, 450m2.kg } with respect to two orthogonal axes of the plane
480m2.kg } ZY which change depending on the time The inertia of the satellite with the panels is of about:
1500m²·kg with respect to X
400m²·kg with respect to Y
1500m²·kg with respect to Z.

To check the feasibility, different manoeuvres were carried out and the corresponding nutation disturbances, determined from roll of the satellite, were measured. The results are given, for fourteen successive manoeuvres, in Table I hereunder:

| Manoeuvre No. | Panel Used | Angle of the manoeuvre (·) | Sun time of the satellite | Increase of nutation (·) |
|---|---|---|---|---|
| 1 | North | 1.6 | 8 h. 50 | |
| 1 | North | 1.6 | 8 h. 50 | |
| 2 | South | 1.6 | 9 h. 15 | |
| 3 | North | 1.6 | 9 h. 50 | 0. |
| 4 | South | 1.6 | 10 h. 36 | −0.0035 |
| 5 | North | 4.8 | 12 h. 30 | 0.0055 |
| 6 | South | 4.8 | 13 h. 10 | 0.015 |
| 7 | North | 4.8 | 13 h. 50 | 0.002 |
| 8 | South | 4.8 | 14 h. 50 | 0.011 |
| 9 | South | 4.8 | 15 h. 40 | −0.003 |
| 10 | South | 4.8 | 16 h. 20 | 0.0056 |
| 11 | South | 4.8 | 16 h. 54 | 0.018 |
| 12 | South | 1.6 | 17 h. 27 | −0.004 |
| 13 | South | 1.6 | 17 h. 53 | −0.003 |
| 14 | South | 2. | 15 h. 29 | −0.015 |

The first ten manoeuvres were to allow calculation of the misalignments of the solar panels. From the eleventh, the manoeuvres were carried out so as to reduce nutation. The damping effect of manoeuvres 11–14 appears in FIG. 7.

It can be seen that a process is thus provided for attenuating the nutation which may be used on any satellite in which at least one solar array rotates about an axis which does not pass through its center of gravity, i.e. represents a variable inertia product for the satellite. The invention is also applicable to any satellite carrying an orientable member exhibiting a variable inertia product with respect to the nutation axis of the satellite.

In practice, a misalignment of the panels will be sufficient not exceeding 1° for damping the nutation by manoeuvring the panels over a time duration lower than 100 sec.

The nutation damping system as described may be combined with a "solar sailing" system for maintaining the momentum direction perpendicular to the orbit plane, i.e. achieving roll/yaw control. Then the same sensors may used with a solar sailing system delivering signals representing $\gamma$ values which are summed to those required for nutation damping.

I claim:

1. A process for controlling nutation of a three axis stabilized momentum biased geostationary satellite, comprising the steps of: locating at least one solar array on said satellite for rotation about a North-South axis with the center of gravity of said solar array being out of said North-South rotation axis by a predetermined amount; measuring the amplitude and phase of satellite nutation; and controlling the rotation speed of said solar array for temporarily and selectively modifying said rotation speed with respect to a constant predetermined average value with such a phase with respect to the nutation motion as to reduce the amplitude of nutation by varying the product of inertia represented by said solar array.

2. Process according to claim 1, wherein the nutation is measured by: sensing satellite roll with an earth sensor; computing the angular motion of said satellite with respect to an inertial reference triad due to nutation from said roll; determining the amounts of rotation to be given to said array responsive to said computed motion.

3. Process according to claim 2, further comprising measuring yaw motion of said satellite due to nutation with a gyrometer or a star sensor.

4. In a three axis stabilized momentum biased geostationary satellite having a body, at least a flywheel in said body providing an angular momentum, at least one solar panel connected to said body for rotation about a North-South axis and biased with respect to said North-South axis to exhibit a non zero product of inertia and motor means for rotating said panel about said axis, an apparatus for controlling nutation of said satellite, comprising:
  first means for providing signals representative of yaw and roll movements about satellite axes caused by nutation,
  second means for deriving yaw and roll rates from said signals,
  third means for determining, from said rates, yaw and roll torques to be applied to said satellite body for damping nutation,
  fourth means for computing the torques to be applied about a sun directed axis and an axis orthogonal thereto from said yaw and roll torques and from signals representing the actual angular position of the satellite about the North-South axis,
  and fifth means for determining a depointing angle to be applied to said solar panel for developing said yaw and roll torques.

5. A satellite as claimed in claim 4, having two said solar panels having rotation axes aligned along a common North-South axis and having different biases, wherein said fifth means include a mathematical model of said two solar panels for developing individual signals applied to panel driving motors for reducing said yaw and roll.

6. A satellite as claimed in claim 5, further comprising means for applying a phase advance to said yaw and roll rate representing signals.

7. A satellite as claimed in claim 4, wherein said solar panel has a center of gravity out of said North-South axis by an angular amount of 2° at most.

* * * * *